(12) United States Patent
Post

(10) Patent No.: US 9,560,943 B2
(45) Date of Patent: Feb. 7, 2017

(54) CLEANING APPARATUS

(71) Applicant: Kenneth Post, Lincoln Park, MI (US)

(72) Inventor: Kenneth Post, Lincoln Park, MI (US)

( * ) Notice: Subject to any disclaimer, the term of this patent is extended or adjusted under 35 U.S.C. 154(b) by 161 days.

(21) Appl. No.: 14/216,384

(22) Filed: Mar. 17, 2014

(65) Prior Publication Data

US 2014/0259500 A1 Sep. 18, 2014

Related U.S. Application Data

(60) Provisional application No. 61/879,819, filed on Sep. 19, 2013, provisional application No. 61/896,734, filed on Oct. 29, 2013, provisional application No. 61/792,262, filed on Mar. 15, 2013.

(51) Int. Cl.
| | |
|---|---|
| *A47L 1/15* | (2006.01) |
| *A47L 1/06* | (2006.01) |
| *A47L 13/16* | (2006.01) |
| *A47L 13/256* | (2006.01) |
| *A47L 13/20* | (2006.01) |
| *A47L 13/254* | (2006.01) |
| *B60S 3/04* | (2006.01) |

(52) U.S. Cl.
CPC .. *A47L 1/15* (2013.01); *A47L 1/06* (2013.01); *A47L 13/16* (2013.01); *A47L 13/20* (2013.01); *A47L 13/254* (2013.01); *A47L 13/256* (2013.01); *B60S 3/045* (2013.01)

(58) Field of Classification Search
CPC ............ A47L 1/06; A47L 13/16; A47L 13/20; A47L 13/24; A47L 13/254; A47L 13/256; A47L 13/257; A47L 13/44; A47L 13/46; A47L 1/15

USPC ......... 15/220.1, 228, 231, 232, 244.2, 244.3
See application file for complete search history.

(56) References Cited

U.S. PATENT DOCUMENTS

| | | |
|---|---|---|
| 296,235 A | 4/1884 | Sill |
| 672,584 A | 1/1901 | Anderson |
| 825,400 A | 7/1906 | Lightbrown |
| 1,084,184 A | 1/1914 | Wenieke |
| 1,158,846 A | 11/1915 | Punch |
| 1,378,243 A | 5/1921 | Kracke |
| 1,675,736 A | 7/1926 | Sturgis |
| 1,708,052 A | 4/1929 | Channell |

(Continued)

FOREIGN PATENT DOCUMENTS

| | | | |
|---|---|---|---|
| CH | 700702 | * | 10/2010 |
| DE | 10003899 | * | 9/2001 |

(Continued)

OTHER PUBLICATIONS partial machine translation of DE 10003899, Sep. 2001.*
International Search Report for PCT/US14/30724 dated Aug. 18, 2014.

*Primary Examiner* — Mark Spisich
(74) *Attorney, Agent, or Firm* — Young Basile Hanlon & MacFarlane, P.C.

(57) ABSTRACT

A cleaning apparatus includes a flexible, initially flat sheet, which is attached to the cleaning head of a cleaning apparatus by interlocking with a compressible foam substrate on the cleaning head, or by attachment members carried on the cleaning head which interact with the sheet itself or with separate attachment members carried on the sheet and the cleaning head.

7 Claims, 6 Drawing Sheets

(56) References Cited

U.S. PATENT DOCUMENTS

| | | | |
|---|---|---|---|
| 1,716,171 A * | 6/1929 | Horihata | A47L 1/06 15/220.1 |
| 1,916,649 A * | 7/1933 | MacPhail | A47L 13/312 15/231 |
| 1,993,571 A | 10/1934 | Soderberg | |
| 1,989,921 A | 2/1935 | Goddard | |
| 2,192,910 A | 4/1937 | Hollenbeck | |
| 2,127,886 A | 7/1937 | Plon | |
| 2,291,435 A | 7/1942 | Anderson et al. | |
| 2,315,325 A | 3/1943 | Gavurin | |
| 2,301,586 A | 11/1943 | Rubin | |
| 2,304,127 A | 12/1943 | Stetson | |
| 2,560,008 A | 7/1951 | Steward | |
| 2,694,212 A | 11/1954 | McGraw | |
| 2,722,704 A | 11/1955 | Warden | |
| 2,764,774 A | 10/1956 | Belsky et al. | |
| 2,790,193 A * | 4/1957 | Wilding | A47L 17/04 15/144.1 |
| 3,099,855 A * | 8/1963 | Nash | A47L 13/29 15/231 |
| 3,295,155 A * | 1/1967 | Belsky | A47L 13/254 15/114 |
| 3,327,338 A * | 6/1967 | Young | A47L 11/29 15/231 |
| 3,362,037 A | 1/1968 | Griffin | |
| 3,704,479 A | 12/1972 | Whitaker | |
| 3,761,991 A | 10/1973 | Moss | |
| 4,503,579 A | 3/1985 | Nicely | |
| 4,822,194 A | 4/1989 | Simonette | |
| 4,852,210 A * | 8/1989 | Krajicek | A47L 13/20 15/144.2 |
| 4,926,522 A | 5/1990 | Wang | |
| 5,003,659 A | 4/1991 | Paepke | |
| 5,012,544 A | 5/1991 | Verry | |
| 5,095,574 A | 3/1992 | Khanzadian | |
| 5,177,831 A * | 1/1993 | Wirth | A47L 13/20 15/235 |
| 5,333,347 A | 8/1994 | Stranders | |
| 5,556,470 A | 9/1996 | Gruber | |
| 5,596,787 A | 1/1997 | Stevens et al. | |
| 5,603,138 A | 2/1997 | Bonis | |
| 5,657,507 A | 8/1997 | Wasak | |
| 5,876,141 A | 3/1999 | Hsu | |
| 5,918,342 A | 7/1999 | Smith et al. | |
| 6,178,584 B1 | 1/2001 | Post et al. | |
| 6,243,909 B1 * | 6/2001 | Graham | A47L 13/40 15/1.52 |
| 6,523,213 B1 | 2/2003 | Post et al. | |
| 6,543,951 B1 | 4/2003 | Bauman | |
| 6,769,153 B1 | 8/2004 | Post et al. | |
| 6,795,999 B1 | 9/2004 | Post et al. | |
| 6,928,687 B2 | 8/2005 | Post et al. | |
| 6,973,695 B1 | 12/2005 | Nesler | |
| 7,231,684 B2 | 6/2007 | Post | |
| 7,343,638 B2 | 3/2008 | Mitchell et al. | |
| 7,401,376 B2 | 7/2008 | Benjamin et al. | |
| 7,555,814 B2 | 7/2009 | Lee et al. | |
| 7,581,273 B2 | 9/2009 | Dobrin et al. | |
| 7,904,987 B2 | 3/2011 | Bayon et al. | |
| 8,250,700 B2 | 8/2012 | Pung et al. | |
| 8,407,848 B2 | 4/2013 | Pung et al. | |
| 2003/0182751 A1 * | 10/2003 | White | B25G 1/06 15/244.3 |
| 2004/0229557 A1 * | 11/2004 | Annis | A47L 13/24 451/557 |
| 2004/0237240 A1 | 12/2004 | Post et al. | |
| 2005/0034260 A1 | 2/2005 | Post | |
| 2005/0138742 A1 | 6/2005 | Jaszenovics et al. | |
| 2006/0200933 A1 * | 9/2006 | McDonnell | A47L 13/20 15/247 |
| 2007/0094829 A1 * | 5/2007 | Dotterman | A47L 13/24 15/228 |
| 2007/0130710 A1 * | 6/2007 | Chen | A47L 13/12 15/115 |
| 2007/0245509 A1 | 10/2007 | Nesler | |
| 2008/0022473 A1 | 1/2008 | Risch et al. | |
| 2008/0034521 A1 | 2/2008 | Probasco | |
| 2008/0172817 A1 | 7/2008 | Riddell | |
| 2009/0025168 A1 | 1/2009 | DeRoma | |
| 2009/0106924 A1 * | 4/2009 | Park | A47L 13/20 15/190 |
| 2009/0144923 A1 * | 6/2009 | Tuman | A47L 13/256 15/210.1 |
| 2011/0020051 A1 * | 1/2011 | Robertson | A47L 13/22 401/268 |
| 2013/0061414 A1 * | 3/2013 | Swist | A47L 13/10 15/209.1 |
| 2014/0013531 A1 * | 1/2014 | Tuman | A47L 13/44 15/231 |

FOREIGN PATENT DOCUMENTS

| | | | |
|---|---|---|---|
| FR | 1056318 | | 10/1953 |
| GB | 109280 | * | 9/1917 |
| GB | 406211 | | 2/1934 |
| GB | 406800 | * | 3/1934 |
| JP | 2007-167092 | * | 7/2007 |

* cited by examiner

FIG. 12
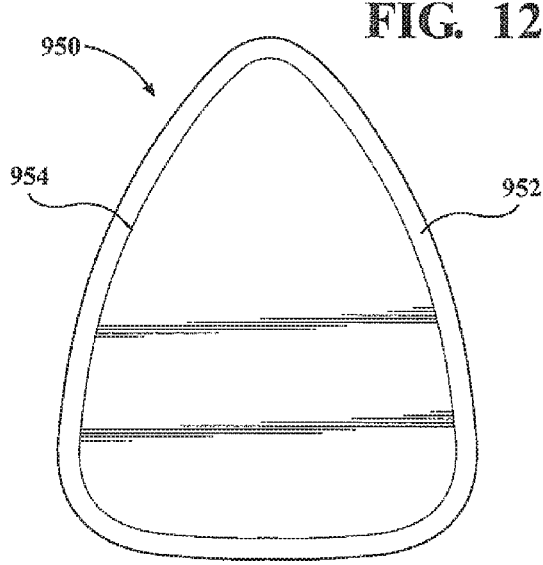
FIG. 13
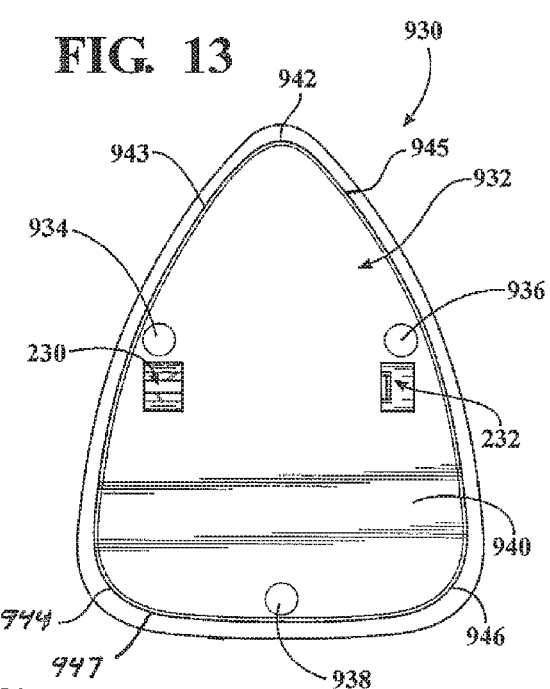
FIG. 14

CLEANING APPARATUS

CROSS REFERENCE TO CO-PENDING APPLICATION

Applicant claims priority benefit to the filing dates of U.S. Provisional Patent Application Ser. No. 61/792,262, filed Mar. 15, 2013, U.S. Provisional Patent Application Ser. No. 61/879,819, filed Sep. 19, 2013 and U.S. Provisional Patent Application Ser. No. 61/896,734, filed Oct. 29, 2013, the contents of each of which are incorporated herein in its entirety.

BACKGROUND

The present disclosure relates, in general, to cleaning apparatus and, more specifically, to apparatus for cleaning glass, mirrors and the like.

Various tools are available to clean glass, such as the exterior surface of vehicle windows. Such tools typically include a handle and a perpendicularly oriented cleaning element, such as a wiper blade, sponge rubber pad, and combinations thereof. Water or ammonia based cleaning fluid is applied to the exterior surface of the vehicle window and scraped off by the tools to remove debris. Such tools are easy to use on the exterior surface of vehicle windows since the exterior surface of the vehicle windows is easily accessible both to apply cleaning fluid to the windows and to remove the fluid and debris from the windows.

A variety of tools have been devised specifically to clean the inner surfaces of vehicle windows. Such tools are typically formed of a pad which is connected to an elongated handle. A cleaning element is attached to one side of the pad by various means including clips, straps, or hooks and pile fasteners. However, each of these tools is specifically devised for a single type of cleaning operation, such as scrubbing or drying, but not both.

An improved and more effective cleaning apparatus is disclosed in U.S. Pat. Nos. 7,231,684 and 6,795,999. In these cleaning apparatus, the inner pad between the bottom surface of the paddle and the encompassing cleaning element or bonnet is formed of an easily absorbent material.

SUMMARY

A cleaning apparatus including a cleaning head having a top surface, a bottom surface and a peripheral surface, a handle pivotally coupled to the cleaning head, an open cell material pad attached to the bottom surface of the cleaning head, and a cleaning element formed of a woven material removably attachable to the pad.

In one aspect the cleaning apparatus includes the open cell material pad is formed of an open cell foam material.

The cleaning apparatus can include a secondary attachment between the cleaning element and the cleaning head including separable complimentary fasteners carried on the cleaning head and the cleaning element.

In one aspect, the cleaning apparatus includes a plurality of releasable attachment members fixed to the top surface of the cleaning head at spaced locations from the peripheral surface of the cleaning head. A cleaning wipe in the form of a flexible material has a plurality of attachment members fixed to the cleaning element at spaced locations for engagement with the attachment members on the cleaning head to releasibly attach the cleaning wipe to the cleaning head.

The attachment members on the cleaning wipe wrap around the edges of the cleaning head.

The attachment members on the cleaning wipe can be fixed on only one surface of the cleaning wipe.

In another aspect, a plurality of attachment members are fixed at spaced locations about the peripheral surface of the cleaning head. The attachment members have an adhesive outer surface. A cleaning wipe formed of flexible material has peripheral portions wrapped around the peripheral surface of the cleaning head to bring portions of the cleaning wipe into releasable attachment including the attachment members on the cleaning head.

The cleaning apparatus including the cleaning wipe is a disposable cleaning wipe made of paper.

BRIEF DESCRIPTION OF THE DRAWING

The various features, advantages, and other uses of the present method and apparatus will become more apparent by referring to the following detailed description and drawing in which:

FIGS. 10, 11 and 12 are planed views showing another aspect of a cleaning element an cleaning head attachment; and FIGS. 13 and 14 are planed views showing yet another aspect of an attachment of a cleaning element to a cleaning head.

DETAILED DESCRIPTION

Figure 2:
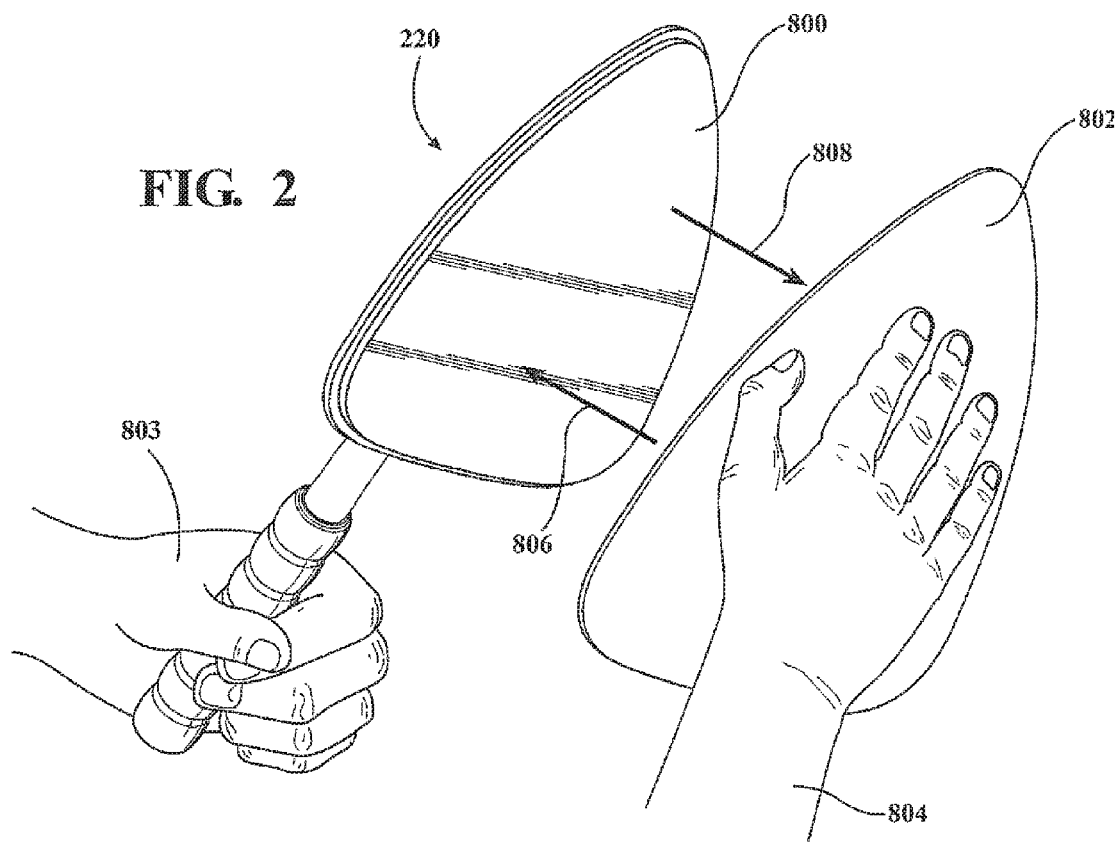
FIG. 2 is an exploded perspective view showing one aspect of an attachment of a cleaning element to the cleaning apparatus shown in FIG. 1.

Referring now to FIG. 2, there is depicted a unique swipe lock attachment of the cleaning element 802 to the cushion or pad 800 carried on one surface of the paddle 220. In this configuration, the cushion or pad 800 is formed of an open cell material structure, such as, but not limited to, open cell foams made of, but also not limited to, polyurethane or polyethylene foams, of either hard or soft density and in any thickness. The open cell structure of the pad 800 interacts with the woven fibers of the cleaning element 802 when the cleaning elements 802 is formed of a woven material, such as micro fiber, paper, etc. Compression, friction, and the opencell structure of the pad or substrate 800 cause the pad 800 to interlock with the woven fibers of the wipe or cleaning element sheet 802

The cleaning element or wipe 802, although capable of having any shape, may have a shape complimentary to the shape of the pad 800 and the paddle 220, with an outer margin or a peripheral surface extending beyond the outer peripheral edge of the pad 800 for a predetermined length, such as between zero and five inches, for example only. This small peripheral margin for the cleaning element 802, provides a maximum cleaning surface while not creating sufficient force to cause separation of the cleaning element 802 from the pad 800 on the paddle 220. Thus, the shape of the cleaning element or wipe 802 mirrors the shape of the cleaning head or paddle structure 220.

The cleaning element 802 can be attached to the open cell foam pad 800 in different ways. In one attachment method shown in FIG. 2, the paddle 220 is held in one hand 803 of the user with the pad 800 facing outward. The user then places his other hand 804 on the outer surface of the cleaning element or wipe 802 and moves the cleaning element 802 in the direction of arrow 806 to bring the cleaning element 802 into contact with the pad 800. The user then swipes or slides his hand 804 sideways or laterally with respect to the pad 800, such as in the direction of arrow 808 to engage substantially all of the cleaning element 802 with the open cell surface of the pad 800.

Figure 3:
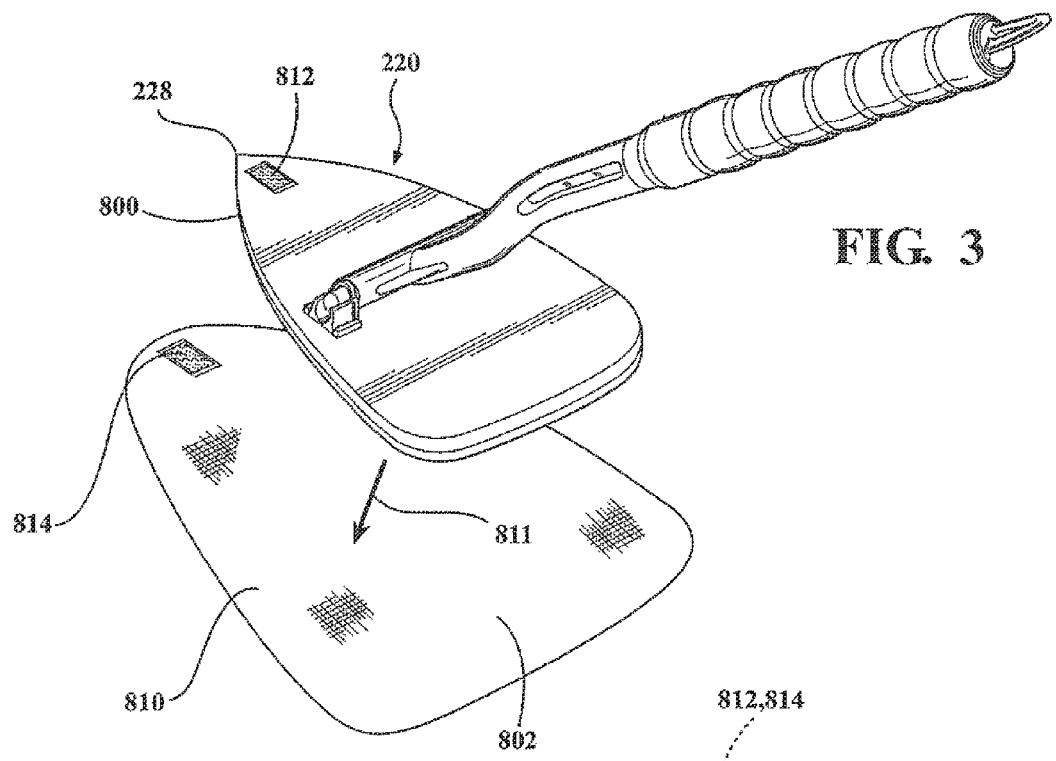
FIG. 3 is an exploded perspective view of another aspect of a cleaning apparatus.
Figure 4:
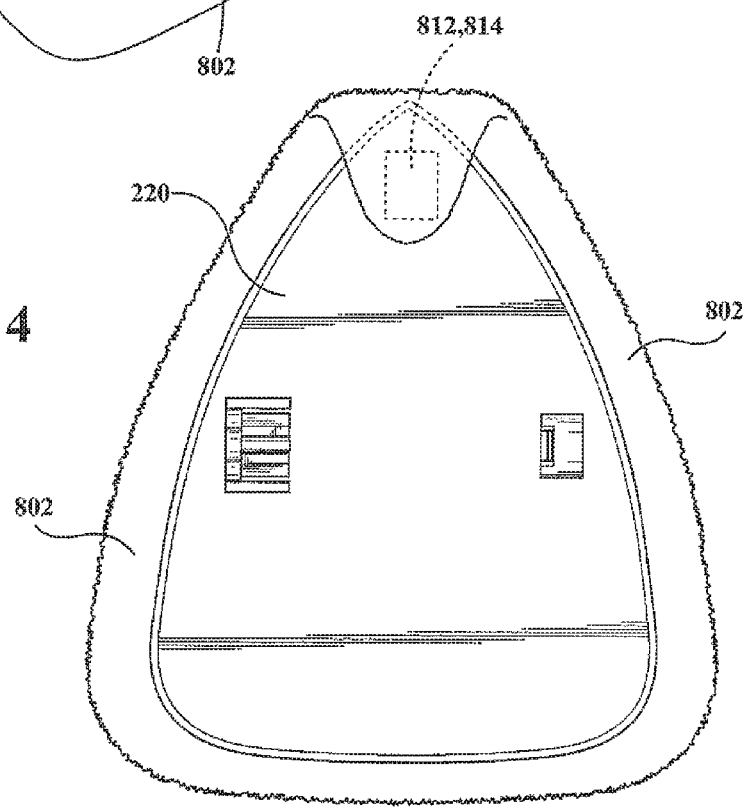
FIG. 4 is a partial plan view showing the attachment of the cleaning element of FIG. 3 on the cleaning head.

Another attachment method is shown in FIGS. 3 and 4 in which the cleaning element or sheet 802 is placed on a flat surface 810, such as a table or counter top, etc. The user then urges the cleaning assembly toward the sheet 802 in the direction of arrow 811 with the pad 800 facing the sheet 802 until the pad 800 fully engages the sheet 802.

An auxiliary attachment process is also shown in FIGS. 3 and 4. In this attachment process, optional mating separable fasteners 812 and 814 are disposed in complimentary locations on the paddle 220 and the cleaning element 802. The releasable fasteners 812 and 814 may be any type of separable fastener, including, but not limited to, Velcro hook and loop type pads, snaps, tape, etc.

In use, with the cleaning element 802 attached to the paddle 220 by either of the two attachments methods shown in FIGS. 3 and 4, for example, the tip end of the cleaning element 802 is folded over the tip 228 of the paddle 220 bringing the fastener 814 attached to the cleaning element 802 into releasable engagement with mating fastener 812 on the paddle 220.

The use of the separable fasteners acts as a secondary attachment of the cleaning element 802 to the pad 800. It is implemented as a "fail safe" attachment to insure that the primary attachment means of the open cell foam construction of the pad 800 with the woven fiber construction of the cleaning element 802 works at maximum performance.

It will be understood that one or more separable fasteners 812 and 814 may be provided at the tip end of the cleaning element 802 and the pad 800. Alternately, secondary attachments using similar releasable fasteners may be provided at the opposite corners of the paddle 220 and cleaning element 802.

The attachment mechanisms described above involving a woven fiber generally flat sheet-like cleaning element 802 and the open cell construction of the pad 800 allows many types of wipe materials to work with the cleaning head since the compression, friction and pressure generated by the paddle 220 as it pushes down on the work surface assist in holding all types of wipe materials in place on the paddle 220.

The sheet-like cleaning element 802 eliminates substantial product cost since the need for an elastic means to secure the current bonnet over the cleaning head or paddle is eliminated. In addition, the sheet like cleaning element 802 does not create any tension or negative force acting against the tip ends of the cleaning head or paddle 220. Thus, one hundred percent of the cleaning head surface remains in constant contact with the surface being cleaned.

Figure 1:
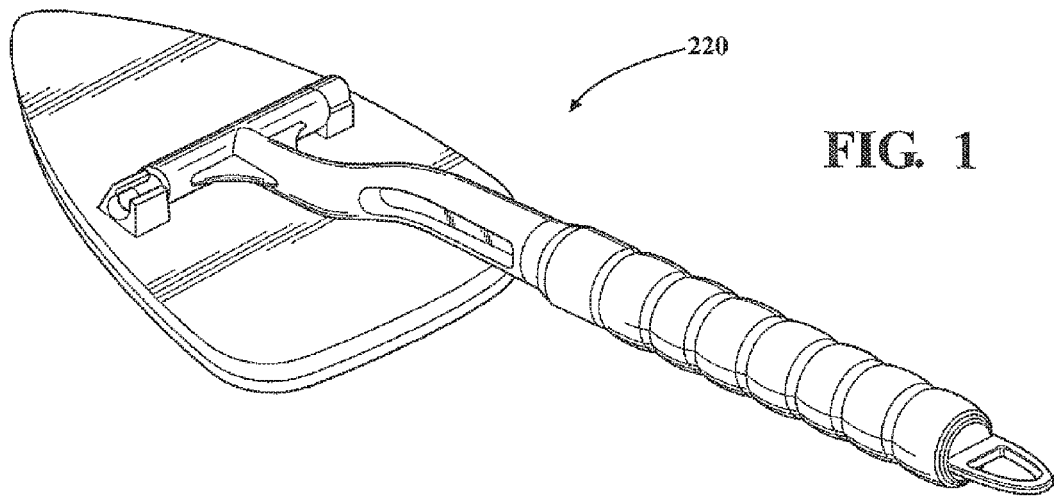
FIG. 1 is a perspective view of a cleaning apparatus.

Referring now to FIGS. 5, 6, 7, 8 and 9, there is depicted a cleaning apparatus 810 which is similar to the cleaning apparatus 220 shown in FIG. 1 in that the cleaning apparatus 810 includes a cleaning head or paddle 220 having a generally illustrated triangular shape. It will be understood that the cleaning head 220 may take other forms, such as square or rectangular, circular, etc.

A pair of receivers 230 and 232, described previously and shown in FIG. 1, are disposed on the upper surface of the cleaning head 220.

The opposite surface of the cleaning head 220 may have any of the constructions described above, including a bottom surface with or without a foam or compressible resilient pad.

Figure 5:
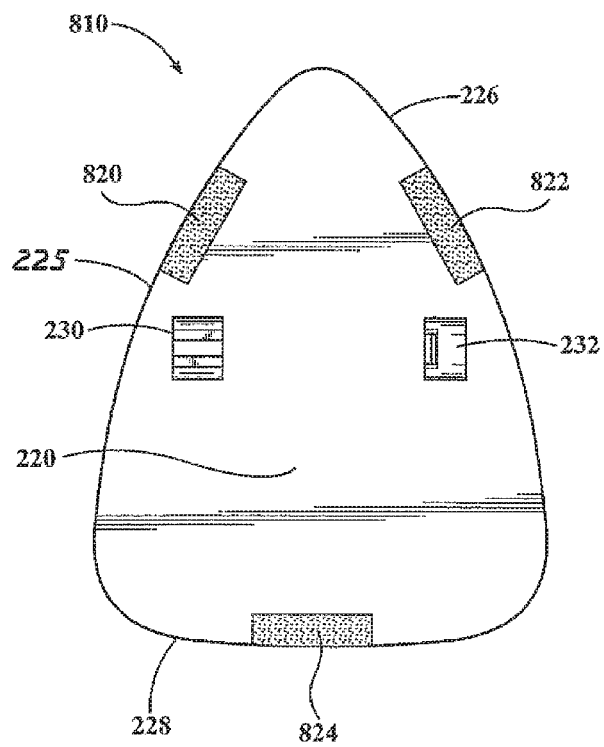
FIG. 5 is a plan view of another aspect of a cleaning head.

As shown in FIG. 5, a plurality of releasable attachment members 820, 822, 824 generally in the form of tabs, strips or pads, are mounted along at least two or all of the sides 225, 226, 228 of the cleaning head 220. By way of example only, the releasable attachment members 820, 822, 824 are in the form Velcro hook or loop strips which are secured to one surface of the cleaning head 220 by suitable means, such as an adhesive.

Figure 6:
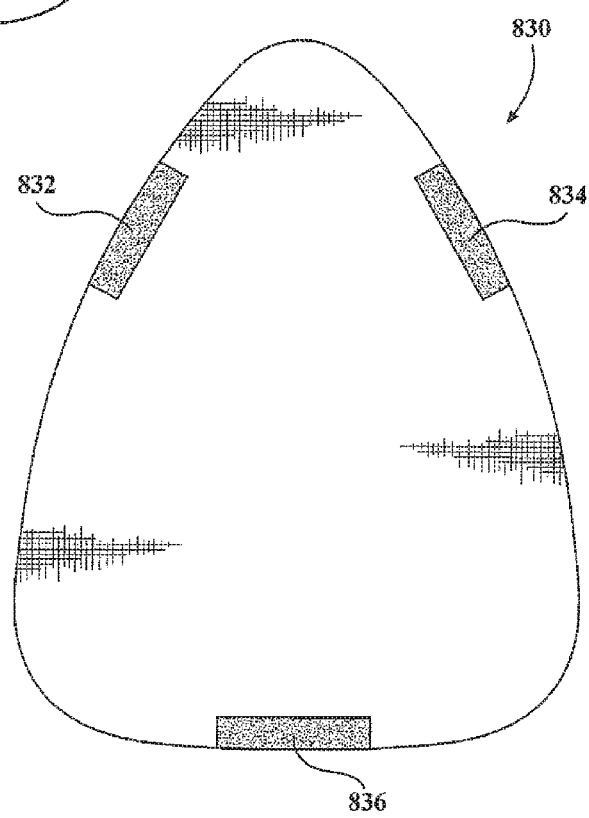
FIG. 6 is a plan view of another aspect of the cleaning element.

The cleaning apparatus 810 also includes a releasable cleaning wipe 830, FIG. 6. The cleaning wipe 830 may have a shape approximate that of the triangular shaped cleaning head 220 or any other shape, complimentary or non-complimentary to the shape of the associated cleaning head 220. Thus, for example, the wipe 830 may have a generally rectangular or square polygonal shape.

The cleaning wipe 830 has a plurality of releasable attachment members 832, 834, 836 releasably attachable to the attachment member 820, 822, 824 mounted on the cleaning head 220 and positioned to releasably engage respective ones of the attachment member 820, 822, 824.

Although any releasable attachment means may be used to form the attachment members 832, 834, 836, since the attachment members 832, 834, 836 are formed of Velcro hook material, for example, the attachment member 820, 822, 824 are formed of releasable mating Velcro loop material.

Figure 7:
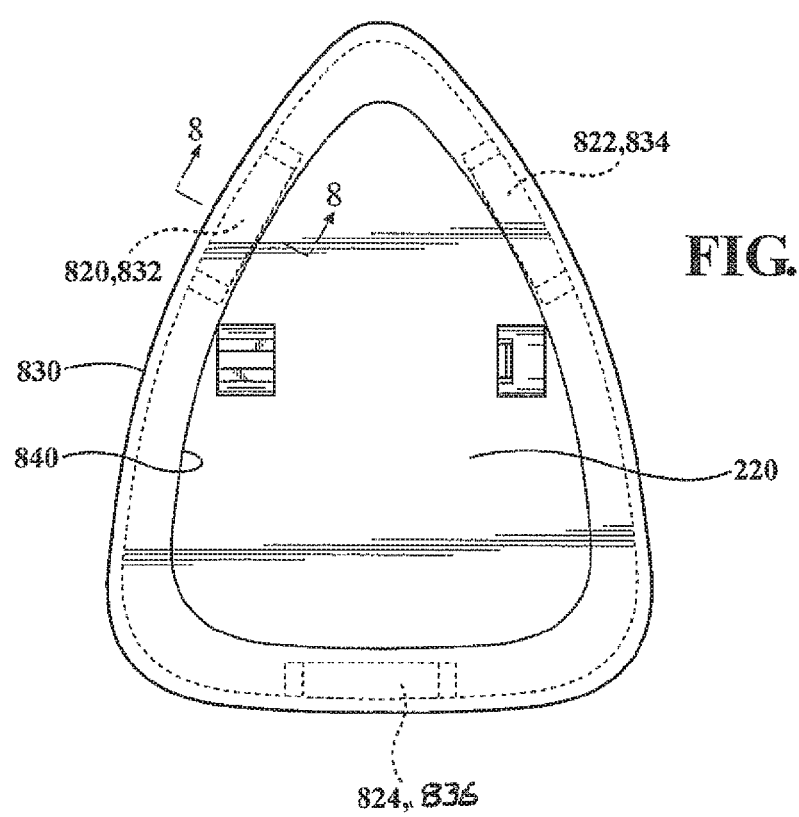
FIG. 7 is a plan view of the attachment of the cleaning element of FIG. 6 on the cleaning head of claim 5.
Figure 9:
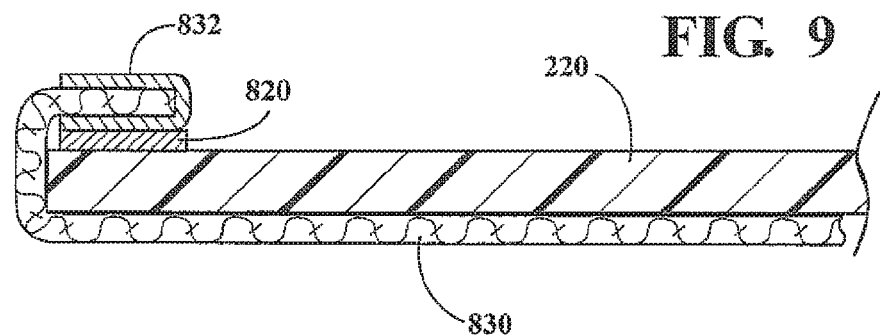
FIG. 9 is a partial cross-sectional view, similar to FIG. 8, but showing an alternate attachment of the cleaning element to the cleaning head.

As shown in FIG. 7, the attachment members 832, 834, 836, such as the attachment member 832 shown in the cross-sectional view of FIG. 9, is stitched over the edge of the sheet of the cleaning wipe 830, such as edge 840. This provides structure to the sheet 830 without detracting from the performance of the sheet 830 in cleaning a surface.

Figure 8:
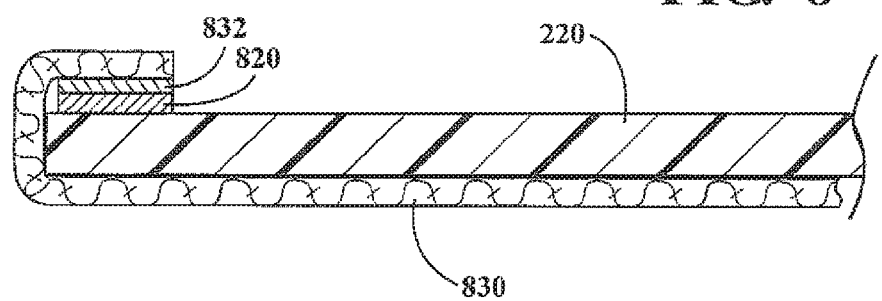
FIG. 8 is partial cross-sectional view generally taken along line 8-8 in FIG. 7.

Alternately, as shown in an alternate construction in FIG. 8, the attachment members, such as attachment member 832, may be attached, such as by adhesive, stitching, etc., to only one surface of the sheet 830.

In use, the cleaning wipe or sheet 830 and the cleaning head 220 are overlaid with each other with the cleaning head 220 substantially centered within the periphery of the sheet and outer edge portions of the sheet extending beyond the sides 225, 226, and 228 of the cleaning head 220. The edges of the sheet 830 are then wrapped around the adjacent edges 225, 226, and 228, respectively, of the cleaning head 220 to bring the attachment members 832, 834, 836 respectively, into releasable engagement with the attachment members 820, 822, 824 on the cleaning head 220. This results in the wrapped arrangement shown in FIGS. 7-9 where the outer edges of the cleaning wipe 830 are secured to the paddle 220 by releasably joined attachment members 820, 822, and 824 and 832, and 834 and 836.

Since the releasable attachment members 832, 834, 836 attached to the cleaning wipe 830 provide support and structure to the sheet to enable it be usable during attachment to the cleaning head 220, any suitable absorbent cleaning material may be used to form the sheet. For example, microfiber, cloth, paper, etc., may be used to form the sheet 830.

Figure 10:
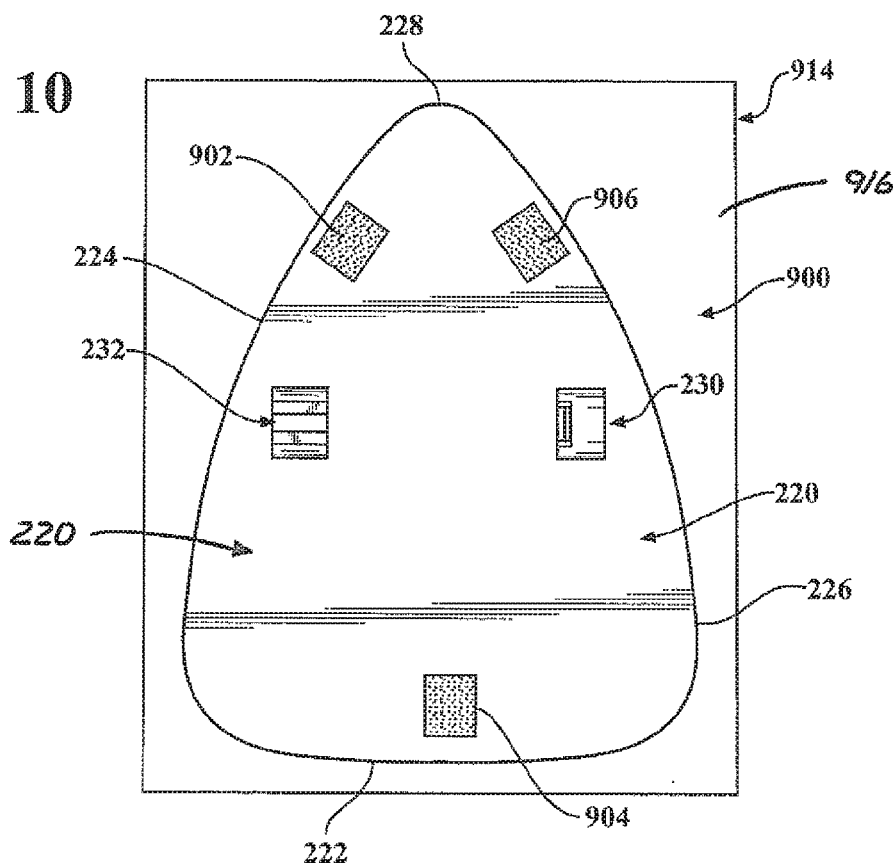
Figure 11:
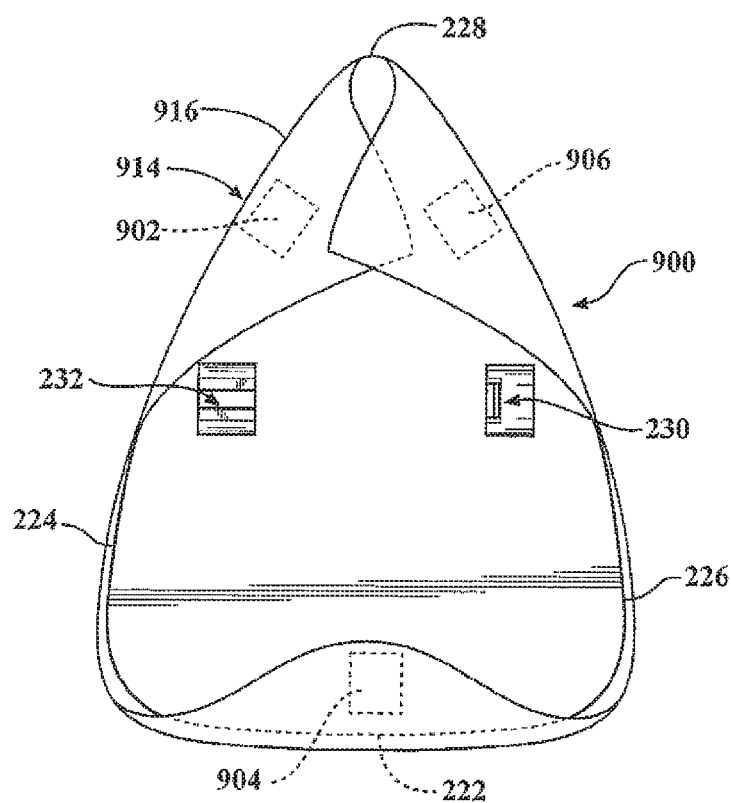

Referring now to FIGS. 10-11, there is depicted a cleaning apparatus 900 using the same cleaning head or paddle 220; but with a different cleaning wipe attachment methodology. In this aspect, an upper or outer surface of the cleaning head 220 is also provided with a plurality of spaced attachment members with three attachment members 902, 904 and 906 shown by way of example only. Each of the attachment members 902, 904 and 906 is positioned adjacent one of the side edges 222, 224, and 226 of the cleaning head 220.

In this aspect of the cleaning apparatus, the attachment members 902, 904 and 906 provide an adhesive lock of a cleaning wipe 914 to the cleaning head 220. By way of example only, the attachment members 902, 904 and 906 are a sticky attachment pad or strip, attached by adhesive to one surface of the cleaning head 220 and providing an adhesive outer surface. The base structure of the adhesive members 902, 904 and 906 may be formed of any suitable base material, such as rubber, plastic, metal; but has a removable and reusable adhesive on the outer surface. For example, a 3M Scotch brand adhesive tab may be used to form the attachment members 902, 904 and 906.

The cleaning wipe 914 can be in the form of a sheet 916 having any suitable dimensions, not just a triangular shape slightly larger than that of the triangular shaped cleaning head 220 shown by example in FIG. 10, but other shapes, such as square or rectangular polygonal shapes as well as circular, oval etc.

To assemble the sheet 916 to the cleaning head 220, the cleaning head 220 is overlaid into contact with the sheet 916. The outer edges of the sheet 916 extending beyond the side edges 224, 222 and 226 of the cleaning head 220 are folded over the side edges 224, 222, and 226 of the cleaning head 220 in a tight smooth fashion into releasable attachment with the attachment members 902, 904 and 906 as shown in FIG. 11. The attachment members 902, 904 and 906 thus releasibly attach the sheet 916 to the cleaning head 220.

Due to the adhesive nature of the attachment members 902, 904, and 906, any material may be used to the form the sheet 916 of the cleaning wipe 914. For example, woven and non-woven materials may be employed, including microfiber, paper, cloth, etc. A paper material, if used, provides a readily disposable cleaning wipe 914.

In use, after the sheet 916 is attached to the cleaning head 220, once one side of the sheet 916 gets overly wet or dirty, the sheet 916 is simply pulled away from the adhesive attachment members 902, 904, and 906, turned over and then re-secured back on the cleaning head 220 via the attachment members 902, 904, and 906.

When both sides of the sheet 916 are overly wet or dirty, the entire sheet 916 can be disposed of, if made of a disposable material, such as paper.

It should be noted that the use of certain materials to form the cleaning wipes as shown in FIGS. 2-12, such as microfiber or cloth, may be washed between uses so as be renewed to a clean condition for subsequent cleaning uses.

Another aspect of a cleaning apparatus 930 shown in FIGS. 12-14.

In this aspect, the cleaning head 932 is formed substantially as shown in FIGS. 1 and 2 with a reduced foam substrate thickness described above.

A plurality of discrete Velcro hook or loop fastener pads 934, 936, 938 are mounted on the top surface 940 of the cleaning head 932, generally, centrally inward of the peripheral edges 943, 945, 947 of the cleaning head 932 between the tip 942 and the opposed corner ends 944, 946.

An enlarged sheet-like cleaning element 950, such as a microfiber-cleaning element, has a shape identical to the peripheral shape of the cleaning head 932 but with slightly larger dimensions sufficient to enable a peripheral edge portion of the cleaning element 950 to be folded over the top surface 940 of the cleaning head 932 as described hereafter. The peripheral edges 952 of the cleaning element 950 can be seamed 954 to provide a clean edge.

In use, the sheet-like cleaning element 950 is laid on a flat surface. The cleaning head 932 is then centered within the cleaning head 932 and brought into engagement with the cleaning element 950. The user then folds over the exposed peripheral edges 950 of the cleaning element 950 until the cleaning element 952 removably, but securely engages the Velcro hook or loop pads 934, 936, and 938 on the top surface 940 of the cleaning head 932.

The folding of the cleaning element 950 over the peripheral edges 943, 945, 947 of the cleaning head 932 secures the cleaning element 950 to the cleaning head 932; but avoids the elastic forces exerted on previously devised cleaning elements with edge elastic bands which led to the excessive compression of the peripheral portions of the foam substrate mounted on the bottom surface of the cleaning head. The reduced thickness foam substrate described for use in this aspect of the cleaning apparatus also contributes to minimizing of any excessive compression of the peripheral edges of the foam substrate. This combination of features provides a substantially square, perpendicular corner between the peripheral edge of the cleaning head and the cleaning element for effective cleaning of the entire surface to be cleaned.

What is claimed:

1. A cleaning apparatus comprising:
a cleaning head having a top surface, a bottom surface and a peripheral surface;
a handle pivotally coupled to the cleaning head, the cleaning head being adapted to be manipulated by the user by grasping the handle and to clean glass and other elevated surfaces;
an open cell material pad attached to the bottom surface of the cleaning head, and
a cleaning element formed of a woven material removably attachable to the pad, the attachment consisting solely of direct engagement and interlocking of the woven material with the open cell material of the pad such that it is retained on the cleaning head when lifted and manipulated by the user.

2. The cleaning apparatus of claim 1 wherein:
the open cell material pad is formed of an open cell foam material.

3. The apparatus of claim 1 wherein the cleaning element comprises a peripheral surface, the cleaning element peripheral surface extending laterally outward from the cleaning head peripheral surface a distance of up to 5 inches.

4. A cleaning apparatus comprising:
a cleaning head having a top surface, a bottom surface and a peripheral surface;
a handle pivotally coupled to the cleaning head;
a cleaning element having a first cleaning surface and a second cleaning surface opposite the first cleaning surface and a peripheral surface;
a material pad attached to the bottom surface of the cleaning head, the material pad adapted to interlock with the material of the cleaning element to provide a first attachment of the cleaning element to the cleaning head; and a plurality of reusable auxiliary adhesive attachment tabs connected to the top surface of the cleaning head, the attachment tabs being positioned radially separated about the cleaning head top surface and laterally inward from the cleaning head peripheral surface, the attachment tabs having a base material having a first surface and a second surface opposite the first surface, the first surface provided with an adhesive layer for attaching it to the top surface of the cleaning head and the second surface provided with an adhesive layer for selective and releasable connection of a portion of the cleaning element selectively placed in contact with a respective auxiliary adhesive attachment tab, wherein the cleaning element first and second cleaning surfaces provides the cleaning element to be reversible with respect to the cleaning head.

5. The cleaning apparatus of claim 4 wherein the plurality of auxiliary adhesive tabs comprises a first, a second and a third adhesive tab.

6. The cleaning apparatus of claim 5 wherein the exposed second adhesive layer is removable from the base material and replaceable.

7. The apparatus of claim 5 wherein the cleaning element comprises a peripheral surface, the cleaning element peripheral surface extending laterally outward from the cleaning head peripheral surface a distance of up to 5 inches.

\* \* \* \* \*